United States Patent
Kim (10) Patent No.: US 8,785,764 B2
(45) Date of Patent: Jul. 22, 2014

(54) PHOTOELECTRIC CONVERSION DEVICE

(75) Inventor: Hyun-Chul Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 184 days.

(21) Appl. No.: 13/450,122

(22) Filed: Apr. 18, 2012

(65) Prior Publication Data

US 2013/0037091 A1 Feb. 14, 2013

(30) Foreign Application Priority Data

Aug. 9, 2011 (KR) .................. 10-2011-0079146

(51) Int. Cl.
*H01L 31/02168* (2014.01)
*H01L 31/048* (2014.01)

(52) U.S. Cl.
USPC ............................ 136/251; 136/256; 136/259

(58) Field of Classification Search
USPC ................... 136/244, 251, 256, 259
See application file for complete search history.

(56) References Cited

U.S. PATENT DOCUMENTS

| 6,469,243 | B2 | 10/2002 | Yamanaka et al. | |
|---|---|---|---|---|
| 2002/0045272 | A1* | 4/2002 | McDevitt et al. | 436/518 |
| 2011/0108111 | A1 | 5/2011 | Yang et al. | |
| 2011/0168225 | A1* | 7/2011 | Yang et al. | 136/244 |

FOREIGN PATENT DOCUMENTS

| JP | 2001-185244 A | 7/2001 |
|---|---|---|
| JP | 2004-119149 A | 4/2004 |
| JP | 2008-117698 A | 5/2008 |
| JP | 2008-226552 A | 9/2008 |
| JP | 2010-277786 A | 12/2010 |
| KR | 10-2011-0050347 A | 5/2011 |

* cited by examiner

*Primary Examiner* — Susan D Leong
(74) *Attorney, Agent, or Firm* — Knobbe, Martens, Olson & Bear, LLP (57) ABSTRACT

A photoelectric conversion device is disclosed. In one embodiment, the device includes i) first and second substrates facing each other, wherein first and second electrodes are formed on the first and second substrates, respectively and ii) an electrolyte inlet formed to pass through the first substrate and configured to receive an electrolyte. The device may further include an inlet sealing member connected to an external surface of the first substrate and outwardly extending from a top portion of the electrolyte inlet, wherein the top portion is formed in the external surface of the first substrate, and wherein the inlet sealing member comprises an encapsulation space being in fluid communication with the electrolyte inlet.

12 Claims, 9 Drawing Sheets

PHOTOELECTRIC CONVERSION DEVICE

RELATED APPLICATIONS

This application claims the benefit of Korean Patent Application No. 10-2011-0079146, filed on Aug. 9, 2011, in the Korean Intellectual Property Office, the disclosure of which is incorporated herein in its entirety by reference.

BACKGROUND

1. Field

The described technology generally relates to a photoelectric conversion device.

2. Description of the Related Technology

Extensive research has recently been conducted on photoelectric conversion devices that convert light into electric energy. From among such devices, solar cells have attracted attention as alternative energy sources to fossil fuels.

As research on solar cells having various working principles has been continuously conducted, wafer-based crystalline silicon solar cells using a p-n semiconductor junction have dominated on the solar cell market. However, the manufacturing costs of such solar cells are high because they are formed of a high purity semiconductor material.

Unlike silicon solar cells, dye-sensitized solar cells include a photosensitive dye that receives visible light and generates excited electrons, a semiconductor material that receives the excited electrons, and an electrolyte that reacts with electrons returning from an external circuit. Since dye-sensitized solar cells have a much higher photoelectric conversion efficiency than other general solar cells, the dye-sensitized solar cells are expected to be used as next-generation solar cells.

SUMMARY

One inventive aspect is a photoelectric conversion device with an electrolyte inlet having a high sealing performance.

Another aspect is a photoelectric conversion device, which includes a first substrate and a second substrate on which a first electrode and a second electrode are respectively formed, facing each other; an electrolyte that is injected via an electrolyte inlet formed through the first substrate and filled between the first and second substrates; and an inlet sealing member that is formed on the first substrate around the electrolyte inlet to protrude therefrom and includes an encapsulation space formed above the electrolyte inlet.

The inlet sealing member may be thermally fused on the first substrate by a glass frit.

The inlet sealing member may surround the electrolyte inlet of the first substrate and protrude to have a width that gradually or step-by-step decreases from the first substrate.

The inlet sealing member may include an opened end that is opened towards the electrolyte inlet; and a closed end that is formed farthest from the electrolyte inlet and closed from the outside.

The opened end may be fused on the first substrate to surround the electrolyte inlet.

The closed end may be closed by hot pressing.

A width of the opened end may be greater than a width of the closed end.

The encapsulation space may be filled with a filling material.

The filling material may be an inert gas or a curable material.

The curable material may be a UV curable material.

The inlet sealing member may be formed of a glass material.

Another aspect is a photoelectric conversion device, which includes: a first substrate and a second substrate on which a first electrode and a second electrode are respectively formed, facing each other; an electrolyte that is injected via an electrolyte inlet formed through the first substrate and filled between the first and second substrates; and an inlet sealing member that is formed on the first substrate around the electrolyte inlet to protrude therefrom and has an opened end that is opened towards the electrolyte inlet and a closed end that is formed on an opposite side of the opened end along a protrusion length and closed from the outside.

An encapsulation space may be formed between the opened end and the closed end, along a protrusion length of the inlet sealing member.

The encapsulation space may be filled with a filling material.

The filling material may be an inert gas or a curable material.

The curable material may be a UV curable material.

The inlet sealing member may have a width that gradually or step-by-step decreases towards the closed end from the opened end.

The opened end may be thermally fused on the first substrate by a glass frit.

The inlet sealing member may have a circular cone shape or a funnel shape.

The inlet sealing member may be formed of a glass material.

Another aspect is a photoelectric conversion device comprising: first and second substrates facing each other, wherein first and second electrodes are formed on the first and second substrates, respectively; an electrolyte inlet formed to pass through the first substrate and configured to receive an electrolyte; and an inlet sealing member connected to an external surface of the first substrate and outwardly extending from a top portion of the electrolyte inlet, wherein the top portion is formed in the external surface of the first substrate, and wherein the inlet sealing member comprises an encapsulation space being in fluid communication with the electrolyte inlet.

In the above device, the inlet sealing member is connected to the first substrate via a glass frit. In the above device, the inlet sealing member has a substantially conical shape. In the above device, the inlet sealing member comprises: a first end that is formed closest to the electrolyte inlet and open towards the electrolyte inlet; and a second end that is formed farthest from the electrolyte inlet and closed when viewed externally from the photoelectric conversion device. In the above device, the first end contacts the first substrate and covers the top portion of the electrolyte inlet.

In the above device, the width of the first end is greater than the width of the top portion of the electrolyte inlet. In the above device, the width of the first end is greater than the width of the second end. In the above device, the encapsulation space is filled with a filling material. In the above device, the filling material comprises an inert gas or a curable material. In the above device, the filling material comprises an ultraviolet (UV) curable material. In the above device, the inlet sealing member is formed of a glass material.

Another aspect is a photoelectric conversion device comprising: first and second substrates facing each other, wherein first and second electrodes are formed on the first and second substrates, respectively; an electrolyte inlet formed to pass through one of the first and second substrates and configured to receive an electrolyte; and an inlet sealing member connected to an external surface of the substrate and extending from a top portion of the electrolyte inlet, wherein the top portion is formed in the external surface of the substrate, and wherein the inlet sealing member comprises i) a first end that is formed closest to the electrolyte inlet, open towards the electrolyte inlet and covers the top portion of the electrolyte inlet and ii) a second end that is formed farthest from the electrolyte inlet and closed when viewed externally from the photoelectric conversion device.

In the above device, the inlet sealing member comprises an encapsulation space formed between the first and second ends. In the above device, the encapsulation space is filled with a filling material. In the above device, the inlet sealing member has a substantially conical shape. In the above device, the width of the first end is greater than the width of the top portion of the electrolyte inlet. In the above device, the inlet sealing member has a width that substantially gradually decreases from the first end to the second end.

Another aspect is a photoelectric conversion device comprising: first and second substrates facing each other; an electrolyte inlet formed to pass through at least one of the first and second substrates and configured to receive an electrolyte; and an inlet sealing member connected to the at least one substrate and extending from a top portion of the electrolyte inlet, wherein the top portion is formed in the external surface of the at least one substrate, and wherein the inlet sealing member is in fluid communication with the electrolyte inlet.

In the above device, the inlet sealing member comprises: a first end that is formed closest to the electrolyte inlet, open towards the electrolyte inlet and covers the top portion of the electrolyte inlet; and a second end that is formed farthest from the electrolyte inlet and closed when viewed externally from the photoelectric conversion device, wherein the inlet sealing member has a width that substantially gradually decreases from the first end to the second end. In the above device, the width of the first end is greater than the width of the top portion of the electrolyte inlet.

DETAILED DESCRIPTION

Reference will now be made in detail to embodiments, examples of which are illustrated in the accompanying drawings, wherein like reference numerals refer to the like elements throughout. The disclosed embodiments should not be construed limiting.

Figure 1:
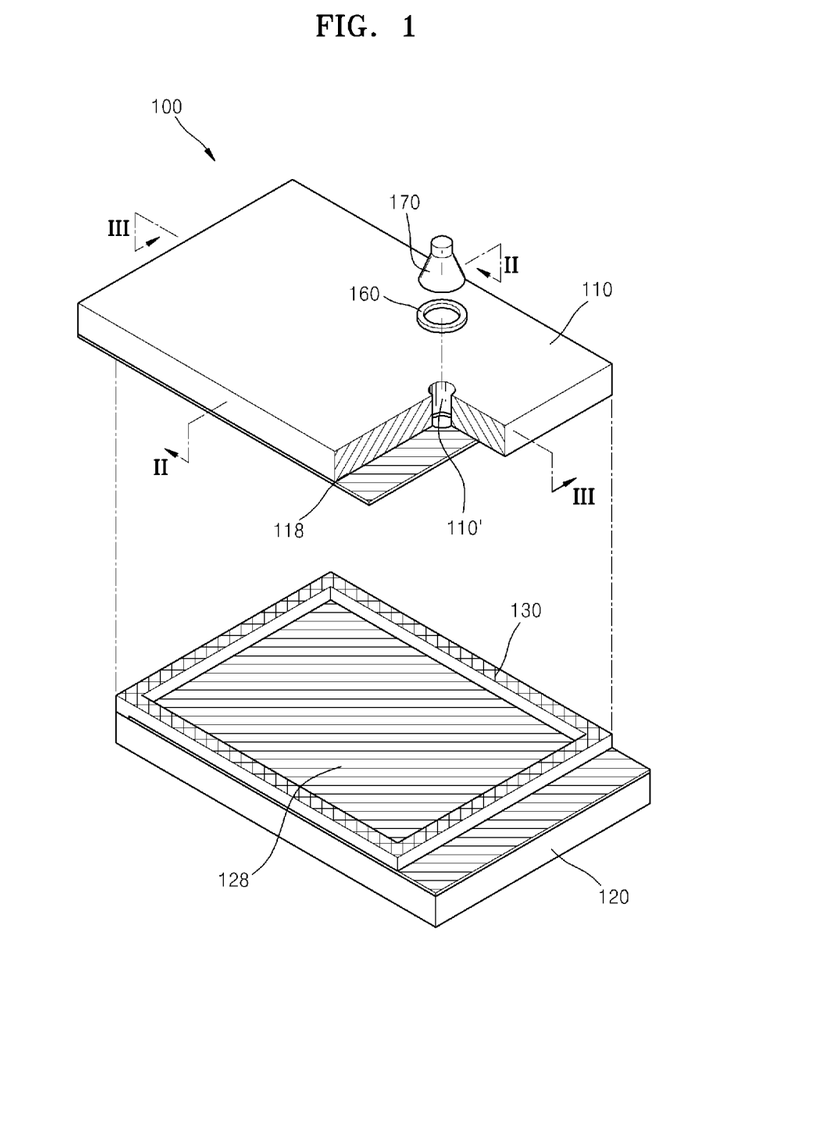
FIG. 1 is an exploded perspective view of a photoelectric conversion device according to an embodiment.

FIG. 1 is an exploded perspective view of a photoelectric conversion device 100 according to an embodiment. Referring to FIG. 1, the photoelectric conversion device 100 includes first and second substrates 110 and 120, a sealing member 130, and an electrolyte inlet 110'. Function layers 118 and 128, which perform photoelectric conversion, are respectively formed on the first and second substrates 110 and 120 to face each other. The sealing member 130 is formed along edges of the substrates 110 and 120 to seal the space between the two substrates 110 and 120. The electrolyte inlet 110' passes through the first substrate 110, and an electrolyte (not shown) is injected into the photoelectric conversion device 100 via the electrolyte inlet 110'

In one embodiment, as shown in FIG. 1, the electrolyte inlet 110' is formed in the first substrate 110, which is a light-receiving substrate. In another embodiment, the electrolyte inlet 110' is formed to pass through the second substrate 120, which is a counter substrate. The electrolyte inlet 110' may also be formed to pass through at least one of the first and second substrates 110 and 120. For the purpose of convenience, the electrolyte inlet 110' formed in the first substrate 110 will be described.

The electrolyte injected into the photoelectric conversion device 100 is sealed by the sealing member 130 so that the electrolyte does not leak to the outside of the photoelectric conversion device 100. At least one of the function layers 118 and 128 includes a semiconductor layer for generating electrons which are excited by irradiated light and electrodes for collecting and discharging the generated electrons. For example, an end of the electrodes constituting the function layers 118 and 128 may extend outside the sealing member 130 to be connected with an external circuit (not shown).

Figure 2:
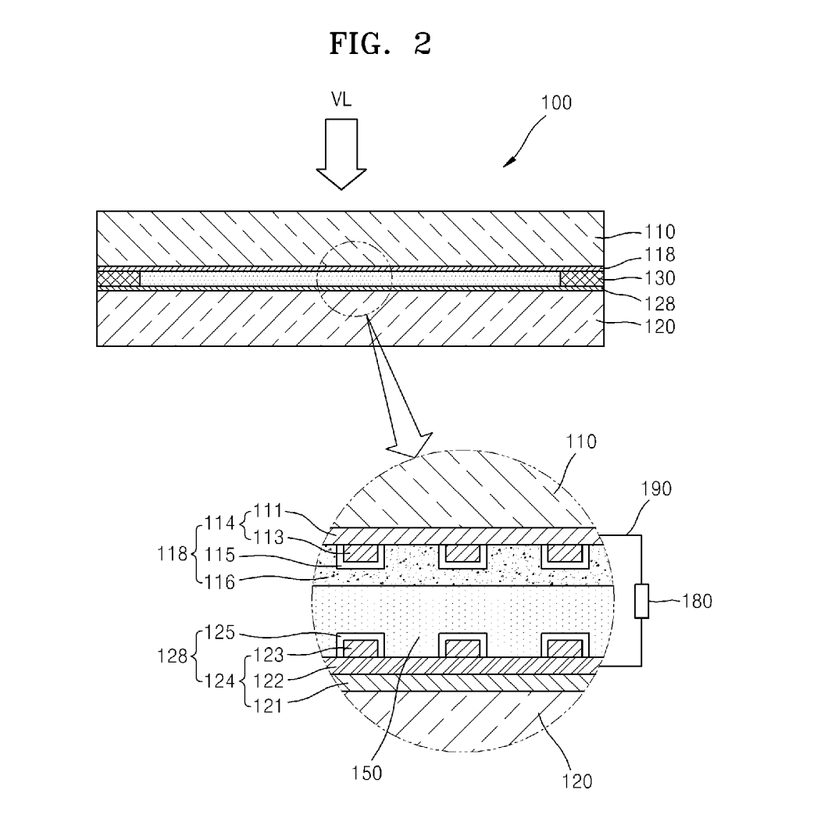
FIG. 2 is a cross-sectional view taken along a line II-II of FIG. 1 according to an embodiment.

FIG. 2 is a cross-sectional view taken along a line II-II of FIG. 1 according to an embodiment. Referring to FIG. 2, a photoelectrode 114 is formed on the first substrate 110 and a counter electrode 124 is formed on the second substrate 120 to face each other. A semiconductor layer 116 is formed on the photoelectrode 114. A photosensitive dye, which has been adsorbed into the semiconductor layer 116, is excited by light VL. An electrolyte 150 is filled between the semiconductor layer 116 and the counter electrode 124. For example, the photoelectrode 114 and the semiconductor layer 116 constitute the function layer 118 of the first substrate 110, and the counter electrode 124 constitutes the function layer 128 of the second substrate 120.

The first and second substrates 110 and 120 are attached to each other via the sealing member 130. The sealing member 130 surrounds an entrance portion of the electrolyte 150 to contain the electrolyte 150, and the electrolyte 150 is sealed by the sealing member 130 so as to prevent the electrolyte 150 from leaking out of the photoelectric conversion device 100.

The photoelectrode 114 and the counter electrode 124 are electrically connected to each other via a conductive wire 190 through an external circuit 180. In a module in which a plurality of photoelectric conversion devices are connected in series or in parallel, photoelectrodes and counter electrodes of the photoelectric conversion devices may be connected in series or in parallel, and the outermost photoelectric conversion devices may be connected to the external circuit 180.

The first substrate 110 may be formed of a transparent material having a high light transmittance. For example, the first substrate 110 may be a glass substrate or a resin film substrate. Since a resin film usually has flexibility, a resin film may be applied to devices requiring flexibility.

The photoelectrode 114 may include a transparent conductive layer 111 and a grid electrode 113 in a mesh pattern that is formed on the transparent conductive layer 111. The transparent conductive layer 111 may be formed of a material having transparency and electrical conductivity, for example, a transparent conducting oxide (TCO) such as indium tin oxide (ITO), fluorine tin oxide (FTO), or antimony tin oxide (ATO). The grid electrode 113 is used to reduce the electrical resistance of the photoelectrode 114 and functions as a collector wire that collects electrons generated by photoelectric conversion and provides a low resistance current path. For example, the grid electrode 113 may be formed of a metal material having high electrical conductivity, such as gold (Ag), silver (Au), or aluminium (Al), and may be patterned into a mesh.

The photoelectrode 114 may function as a negative electrode of the photoelectric conversion device 100 and may have a high aperture ratio. Since the light VL incident onto the photoelectrode 114 excites a photosensitive dye adsorbed on the semiconductor layer 116, the photoelectric conversion efficiency thereof may be improved when the amount of the incident light VL is increased.

A protective layer 115 may be further formed on an outer surface of the grid electrode 113. The protective layer 115 prevents the grid electrode 113 from being damaged, for example, from eroding, when the grid electrode 113 contacts and reacts with the electrolyte 150. The protective layer 115 may be formed of a material that does not react with the electrolyte 150, for example, a curable resin material.

The semiconductor layer 116 may be formed of a semiconductor material that is usually used in a general photoelectric conversion device, for example, an oxide of a metal selected from cadmium (Cd), zinc (Zn), indium (In), plumbum (Pb), molybdenum (Mo), tungsten (W), stibium (Sb), titanium (Ti), silver (Ag), manganese (Mn), stannum (Sn), zirconium (Zr), strontium (Sr), gallium (Ga), silicon (Si), and chromium (Cr). The semiconductor layer 116 may improve the photoelectric conversion efficiency thereof by adsorbing the photosensitive dye. For example, the semiconductor layer 116 may be formed by coating a paste of semiconductor particles having a particle diameter of about 5 nm to about 1000 nm on the first substrate 110 on which the photoelectrode 114 is formed and applying heat or pressure to a resultant structure.

The photosensitive dye adsorbed on the semiconductor layer 116 may absorb the light VL passing through the first substrate 110, so that electrons of the photosensitive dye are excited from a ground state. The excited electrons are transferred to the conduction band of the semiconductor layer 116 through electrical contact between the semiconductor layer 116 and the photosensitive dye, to the semiconductor layer 116, and to the photoelectrode 114, and are discharged out of the photoelectric conversion device 100 through the photoelectrode 114, thereby forming a driving current for driving the external circuit 180.

For example, the photosensitive dye adsorbed on the semiconductor layer 116 may include molecules that absorb visible light VL and excite electrons so as to allow the excited electrons to be rapidly moved to the semiconductor layer 116. The photosensitive dye may be a liquid type, semi-solid gel type, or solid type photosensitive dye. For example, the photosensitive dye may be a ruthenium-based photosensitive dye. The semiconductor layer 116 may be obtained by dipping the first substrate 110 on which the semiconductor layer 116 is formed in a solution containing a predetermined photosensitive dye.

The electrolyte 150 may be a redox electrolyte containing reduced/oxidized (R/O) couples. The electrolyte 150 may be a solid type, gel type, or liquid type electrolyte.

The second substrate 120 is not necessarily transparent. However, in order to improve the photoelectric conversion efficiency of the photoelectric conversion device 100, the second substrate 120 may be formed of a transparent material so that the light VL may pass through both sides of the photoelectric conversion device 100 and may be formed of the same material as that of the first substrate 110. For example, if the photoelectric conversion device 100 is installed as a building integrated photovoltaic (BIPV) system in a structure, e.g., a window frame, both sides of the photoelectric conversion device 100 may be transparent so that the light VL introduced into a building is not blocked.

The counter electrode 124 may include a transparent conductive layer 121 and a catalyst layer 122 formed on the transparent conductive layer 121. The transparent conductive layer 121 may be formed of a material having transparency and electrical conductivity, for example, a TCO such as ITO, FTO, or ATO. The catalyst layer 122 may be formed of a reduction catalyzing material for providing electrons to the electrolyte 150, for example, a metal such as platinum (Pt), gold (Ag), silver (Au), copper (Cu), or aluminum (Al), a metal oxide such as tin oxide, or a carbonaceous material such as graphite.

In one embodiment, the counter electrode 124 functions as a positive electrode of the photoelectric conversion device 100 and also as a reduction catalyst for providing electrons to the electrolyte 150. The photosensitive dye adsorbed on the semiconductor layer 116 absorbs the light VL to excite electrons, and the excited electrons are discharged from the photoelectric conversion device 100 through the photoelectrode 114. The photosensitive dye losing the electrons receive electrons generated by oxidization of the electrolyte 150, and the oxidized electrolyte 150 is reduced again by electrons passing through the external circuit 180 and reaching the counter electrode 124, thereby completing the operation of the photoelectric conversion device 100.

The counter electrode 124 may include a grid electrode 123. The grid electrode 123 may be formed on the catalyst layer 122. The grid electrode 123 is used to reduce the electrical resistance of the counter electrode 124 and provides a low resistance current path for collecting electrons reaching the counter electrode 124 via the external circuit 180 and providing the electrons to the electrolyte 150. For example, the grid electrode 123 may be formed of a metal material having high electrical conductivity, such as Ag, Au, or Al, and may be patterned into a mesh.

A protective layer 125 may be further formed on an outer surface of the grid electrode 123. The protective layer 125 prevents the grid electrode 123 from being damaged, for example, from eroding, when the grid electrode 123 contacts and reacts with the electrolyte 150. The protective layer 125 may be formed of a material that does not react with the electrolyte 150, for example, a curable resin material.

Figure 3:
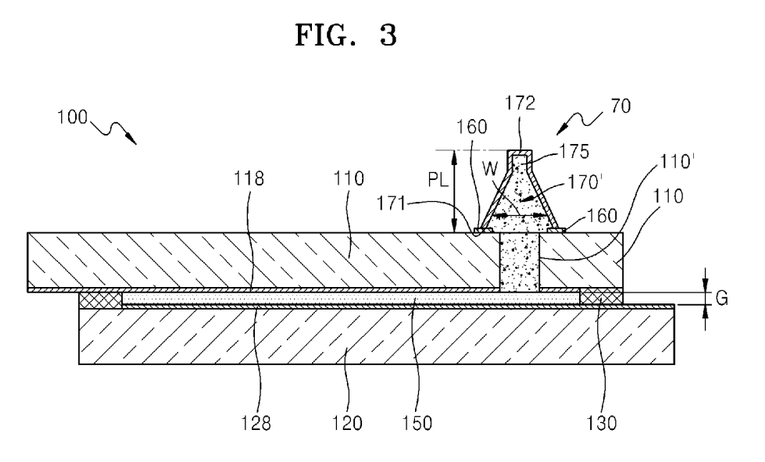
FIG. 3 is a cross-sectional view taken along a line III-III of FIG. 1 according to an embodiment.
Figure 4:
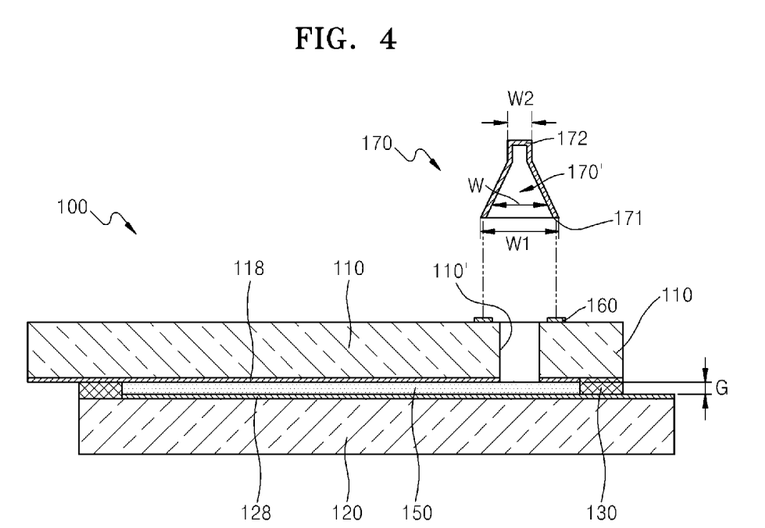
FIG. 4 is a cross-sectional view of the photoelectric conversion device illustrated in FIG. 3 according to another embodiment.

FIGS. 3 and 4 are cross-sectional views taken along a line III-III of FIG. 1, according to embodiments, the views for explaining a sealing structure of the electrolyte inlet 110'.

Referring to FIGS. 3 and 4, a substrate gap G with an appropriate size is formed between the first and second substrates 110 and 120 in such a manner that the sealing member 130 is interposed between the substrates 110 and 120 along edges thereof, and predetermined pressure and heat are applied thereto to attach the first substrate 110 to the second substrate 120. The substrate gap G is filled with the electrolyte 150. For example, the electrolyte inlet 110' for providing an inlet path of the electrolyte 150 is formed to pass through the first substrate 110. The electrolyte inlet 110' is formed to pass through the first substrate 110 and connected to the substrate gap G. For example, the electrolyte inlet 110' may have a substantially cylinder shape.

The electrolyte inlet 110' is sealed by an inlet sealing member 170. The inlet sealing member 170 is fixed on the first substrate 110 through which the electrolyte inlet 110' is formed and covers the electrolyte inlet 110', thereby sealing the electrolyte inlet 110'. The inlet sealing member 170 protrudes from the first substrate 110 and has an encapsulation space 170' above the electrolyte inlet 110'. The encapsulation space 170' may be used to prevent the electrolyte 150 from being degenerated due to permeation of external impurities. For example, a filling material 175 (refer to FIG. 3) may be injected into the encapsulation space 170' to fill the inside of the encapsulation space 170' and prevent impurities that permeate into the encapsulation space 170' from reacting with the electrolyte 150.

For example, the filling material 175 in the encapsulation space 170' may prevent the electrolyte 150 from reacting with moisture or humidity in air, whereby physical properties of the electrolyte 150 are not deteriorated. The filling material 175 is not particularly limited and may be any material that prevents the electrolyte 150 from reacting with external impurities. For example, the filling material 175 may be air. In particular, the inlet sealing member 170 may be maintained in an open state before a closed end manufacturing process, and the filling material 175 may prevent the electrolyte 150 from contacting external impurities before the closed end 172 is formed.

The inlet sealing member 170 may be formed on the first substrate 110 by protruding therefrom to have a predetermined length. A protrusion length PL of the inlet sealing member 170 may be appropriately adjusted according to applications of the photoelectric conversion device 100. The inlet sealing member 170 may have a protrusion length PL shorter than it appears in FIGS. 3 and 4 so that the photoelectric conversion device 100 is thin.

For example, when the photoelectric conversion device 100 is installed on windows and doors of buildings, e.g., a building integrate photovoltaic (BIPV) system, the photoelectric conversion device 100 is integrated with a chassis frame by being mounted thereon, for use in buildings. In this regard, the chassis frame (not shown) into which the photoelectric conversion device 100 is fitted and assembled may include a groove or a hole capable of accommodating the protrusion length PL. Furthermore, the protrusion length PL of the inlet sealing member 170 may be flexibly adjusted so that the photoelectric conversion device 100 and the chassis frame fit into each other.

The inlet sealing member 170 may be thermally fused on the first substrate 110 via a glass frit 160 and formed of a glass material. The photoelectric conversion device 100 operates at a temperature in the range of about 50□ to about 80□, and thus a certain degree of temperature differences during on/off operations of the photoelectric conversion device 100 are accompanied. In this regard, as the difference between thermal expansion coefficients of the inlet sealing member 170 and the glass frit 160 and the difference between thermal expansion coefficients of the inlet sealing member 170 and the first substrate 110 increase, thermal stress occurs on a fused portion of the inlet sealing member 170 and the adhesion force between the inlet sealing member 170 and the first substrate 110 may decrease.

In other words, the thermal expansion coefficients of the inlet sealing member 170, the first substrate 110, and the glass frit 160 may be within similar ranges to each other. For example, the three elements 110, 160 and 170 are formed of a glass material, and thus the thermal expansion coefficients thereof are within similar ranges to each other. The inlet sealing member 170 may be formed of one selected from glass materials that exhibit excellent fixation properties with the glass frit 160 and have a similar thermal expansion coefficient to those of the glass frit 160 and the first substrate 110.

The inlet sealing member 170 may be formed on the first substrate 110 by protruding therefrom to have a predetermined protrusion length PL, and have a width W that varies in a protrusion direction. For example, the width W of the inlet sealing member 170 may gradually decrease away from the electrolyte inlet 110', and a closed portion of the inlet sealing member 170 (corresponding to the closed end 172) that is the farthest from the electrolyte inlet 110' may be closed by thermal compression. However, the shape of the inlet sealing member 170 is not limited to the above example. For example, the inlet sealing member 170 may have a width W that varies step by step.

For example, the electrolyte inlet 110' may have a cylinder shape, and the inlet sealing member 170 may have a round curved surface that surrounds the cylinder-type electrolyte inlet 110'. In other words, a side surface of the inlet sealing member 170 may have a curved shape. For example, the inlet sealing member 170 may have a substantially circular cone shape (or conical shape) or a substantially funnel shape that has a diameter varying in a protrusion direction. The inlet sealing member 170 may be formed to have a circular cone shape, or, as illustrated in FIG. 4, may be formed to have a funnel shape that has a width W that varies along the protrusion length PL from the first substrate 110 and an approximately constant width W2 at a position adjacent to the closed end 172.

The closed end 172 of the inlet sealing member 170 may be formed by hot pressing, and a final shape of the inlet sealing member 170 may vary according to a closed position (corresponding to the closed end 172) of the inlet sealing member 170 when the hot pressing process is performed.

The inlet sealing member 170 includes an opened end 171 (or a first end) that is attached on the first substrate 110 around the electrolyte inlet 110' and has a shape opened towards the electrolyte inlet 110', and the closed end 172 (or a second end) that is formed on the opposite side of the opened end 171 along the protrusion length PL and has a shape closed from the outside. In one embodiment, along the protrusion length PL of the inlet sealing member 170, the opened end 171 that is formed nearest to the electrolyte inlet 110' is opened towards the electrolyte inlet 110' and the closed end 172 that is formed farthest from the electrolyte inlet 110' is closed when viewed externally from the photoelectric conversion device 100.

For example, the opened end 171 may have a relatively large width W1 and the closed end 172 may have a relatively small width W2. In other words, the width W1 of the opened end 171 and the width W2 of the closed end 172 may satisfy an inequality of W1>W2.

The width W denotes the width of the cross-section of the inlet sealing member 170. For example, if the inlet sealing member 170 has a circular cone shape or a funnel shape, the width W may correspond to a diameter, and the opened end 171 may have a large diameter and the closed end 172 may have a small diameter.

The inlet sealing member 170 may have a substantially circular cone shape having a width W that gradually decreases between the opened end 171 and the closed end 172. The opened end 171 surrounds the electrolyte inlet 110', and the closed end 172 formed on the opposite side of the opened end 171 may be formed to have the width W2 so as to easily close the inlet sealing member 170 by, for example, thermal compression or hot pressing.

In one embodiment, a thermal fusion portion is formed between the opened end 171 and the first substrate 110 by the glass frit 160. If the thermal fusion portion of the glass frit 160 is formed too close to the electrolyte inlet 110', the thermal fusion portion may be contaminated by the electrolyte 150 that may be leaked out of the electrolyte inlet 110' and the electrolyte 150 may be degenerated when the thermal fusion is performed using an external heating source.

To resolve these problems, for example, the opened end 171 may be formed to have a relatively large width W1 so as to widely surround the electrolyte inlet 110'. The closed end 172 provides a closed end portion to the inlet sealing member 170 and may be formed by heating or compression.

The inlet sealing member 170 includes the encapsulation space 170' above the electrolyte inlet 110'. The encapsulation space 170' may be formed between the opened end 171 and the closed end 172. The encapsulation space 170' is filled with the filling material 175. The filling material 175 may be a gas-phase constituent such as air or an inert gas or a curable material capable of being gelated by an appropriate curing process, but is not limited thereto.

The filling material 175 may be in any state of solid, liquid, and gas and may be any material that fills the encapsulation space 170' defined by the inlet sealing member 170 to form an appropriate pressure. The inlet sealing member 170 is subjected to a thermal compression process to form the closed end 172. In this regard, if the electrolyte 150 reaches the closed end 172 through the inlet sealing member 170, the thermal compression process and a cutting process may not be properly performed and the electrolyte 150 may be heated or contaminated, thereby being degenerated. Thus, the encapsulation space 170' is filled with the filling material 175 and an appropriate pressure is formed therein. Accordingly, the filling material 175 presses the electrolyte 150 and prevents the electrolyte 150 from reaching the closed end 172. However, the filling material 175 may be selectively used.

The filling material 175 does not chemically react with the electrolyte 150 by contact and may be composed of a material with chemical resistance, for example, an inert gas or a UV curable material. For example, the UV curable material is in a state of gelation or solidification caused by irradiation of UV rays and is cured in a state where the UV curable material is inserted into the electrolyte inlet 110', thereby not being permeated into the electrolyte 150 through the electrolyte inlet 110'. For example, the filling material 175 including the UV curable material may fill the encapsulation space 170' defined by the inlet sealing member 170 and the electrolyte inlet 110'. In one embodiment, the filling material 175 is injected in a liquid or paste state to fill the encapsulation space 170' and the electrolyte inlet 110' and is cured to be gelated or solidified. Thus, the gelated or solidified filling material 175 does not permeate into the electrolyte inlet 110'. For example, when the filling material 175 is cured, the cured filling material 175 does not permeate into the electrolyte inlet 110'. In one embodiment, the location of the filling material 175 is restricted to the encapsulation space 170', and the filling material 175 does not permeate into the substrate gap G filled with the electrolyte 150.

FIGS. 5A through 5K are cross-sectional views sequentially illustrating a method of manufacturing a photoelectric conversion device according to an embodiment. First, the first substrate 110 and the second substrate 120 on which the function layers 118 and 128 are respectively formed are prepared (refer to FIG. 5A). The electrolyte inlet 110' for injecting an electrolyte is formed to pass through at least one of the first and second substrates 110 and 120. For example, the electrolyte inlet 110' may be formed to pass through the first substrate 110.

Figure 5A:
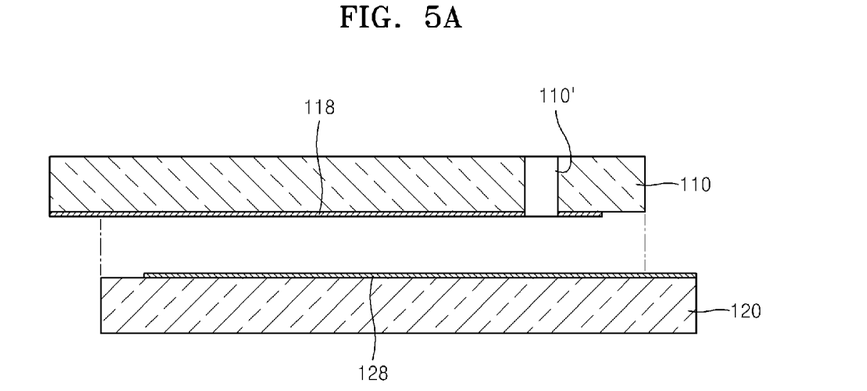
FIGS. 5A through 5K are cross-sectional views sequentially illustrating a method of manufacturing a photoelectric conversion device according to an embodiment.
Figure 5B:
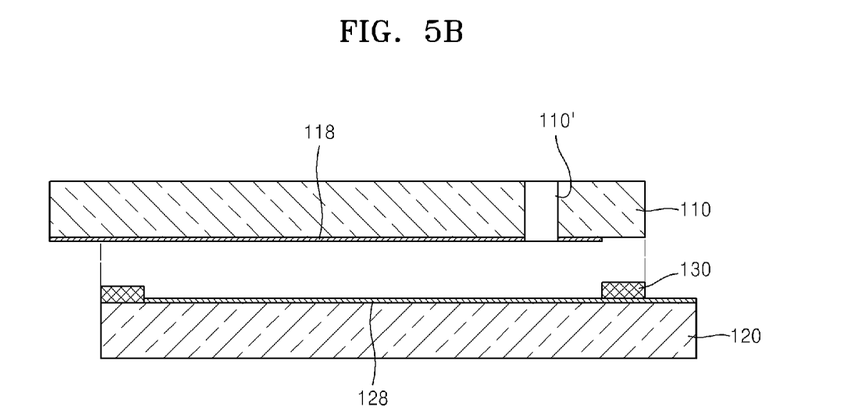
Figure 5C:
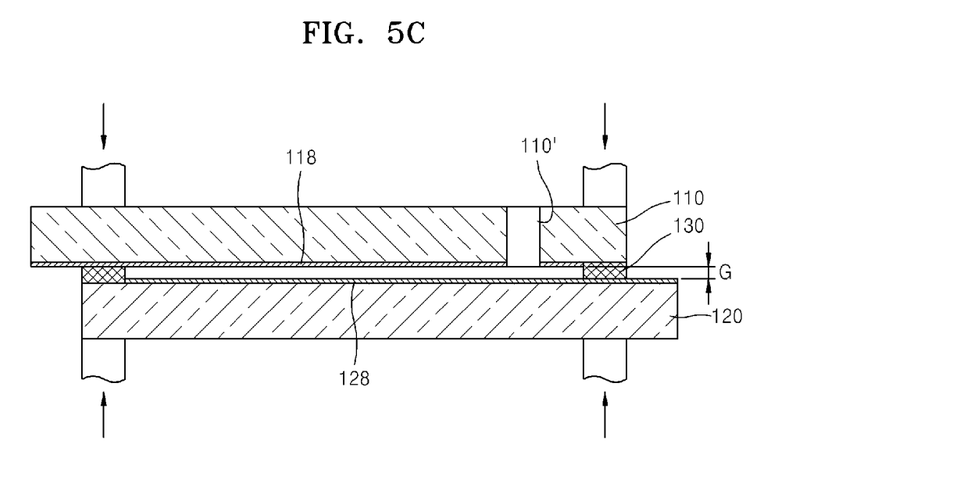

Subsequently, the first and second substrates 110 and 120 are positioned to face each other, and the sealing member 130 is formed on edges of the substrates 110 and 120 (refer to FIG. 5B). For example, a thermal fusion film as the sealing member 130 is disposed on edges of the second substrate 120, and predetermined heat and pressure are applied thereto to attach the two substrates 110 and 120 to each other, thereby forming the substrate gap G into which the electrolyte 150 is to be injected (refer to FIG. 5C).

Figure 5D:
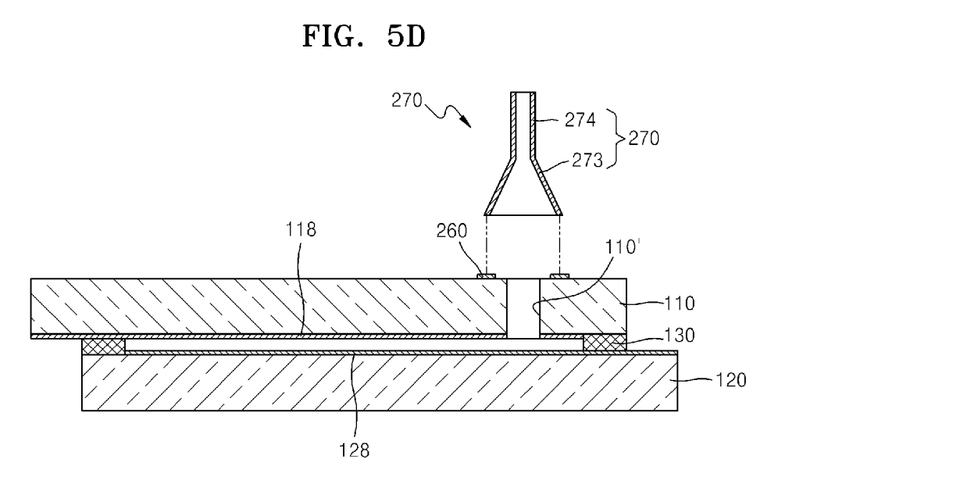

Next, a glass frit 260 is applied around the electrolyte inlet 110' formed in the first substrate 110 (refer to FIG. 5D). In one embodiment, the glass frit 260 is heated by an external heating source such as a laser to be a melting or semi-melting state, thereby intermediating an adhesion between the first substrate 110 and an inlet sealing member 270.

Next, the inlet sealing member 270 is mounted on the glass frit 260 (refer to FIG. 5D). The inlet sealing member 270 may be fixed on the first substrate 110 by thermal fusion. In this regard, the inlet sealing member 270 may be a tube with a funnel shape.

For example, the inlet sealing member 270 may include a base part 273 encompassing the electrolyte inlet 110' and an extension part 274 that protrudes from the base part 273 and extends away from the first substrate 110. The base part 273 is formed to have a relatively large width and widely surround the electrolyte inlet 110' formed in the first substrate 110. The extension part 274 is formed to have a relatively small width. For example, one portion of the extension part 274 is subjected to heating and compression and then cut, thereby forming a closed end.

Figure 5E:
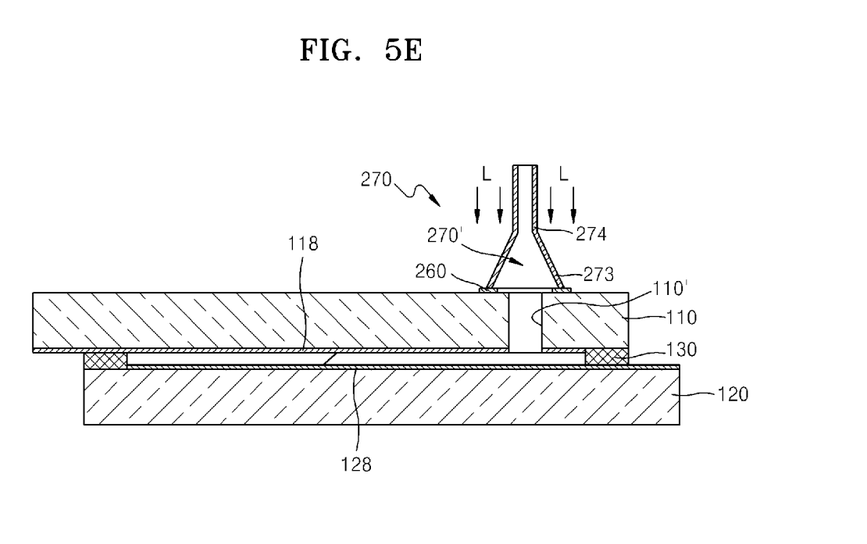

Next, an external heating source such as a laser L is applied on the glass frit 260, thereby thermally fusing the glass frit 260 to fix the inlet sealing member 270 on the first substrate 110 by the glass frit 260 (refer to FIG. 5E). In this embodiment, the laser L is used as a heating source for thermal fusion, but other appropriate heating sources may also be used.

Since the inlet sealing member 270 is fixed on the first substrate 110, an internal space 270' connected with the electrolyte inlet 110' is formed therein. The internal space 270' forms an encapsulation space that is connected with the electrolyte inlet 110' and isolated from the outside, when an end of the inlet sealing member 270 is closed.

Figure 5F:
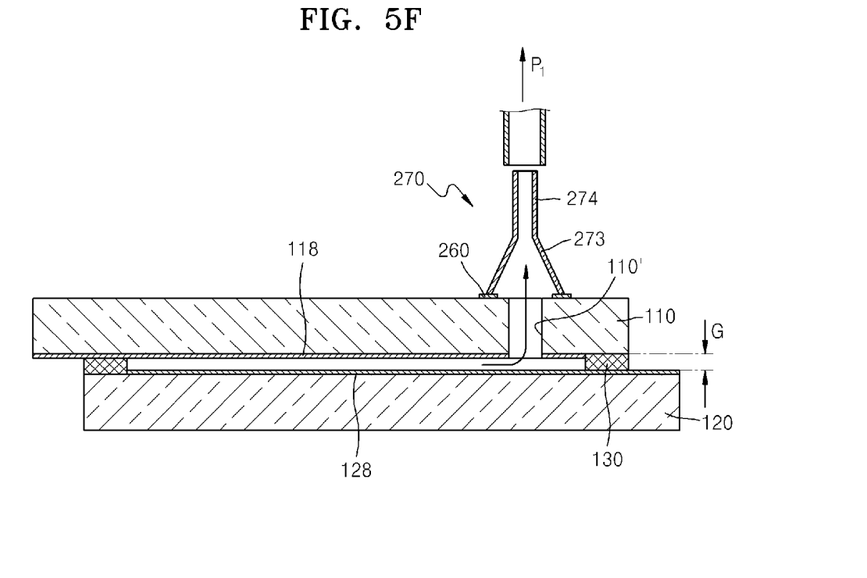

Next, impurities are discharged from the substrate gap G through the inlet sealing member 270 fixed on the first substrate 110 (refer to FIG. 5F). For example, a suction means (not shown) capable of providing a negative pressure P1, such as a fluid pump, is connected to an end of the inlet sealing member 270, and gases remaining in the substrate gap G may be discharged by operating the suction means. The inlet sealing member 270 provides an exhaust path for impurity gases to easily discharge the impurity gases remaining in the substrate gap G.

Figure 5G:
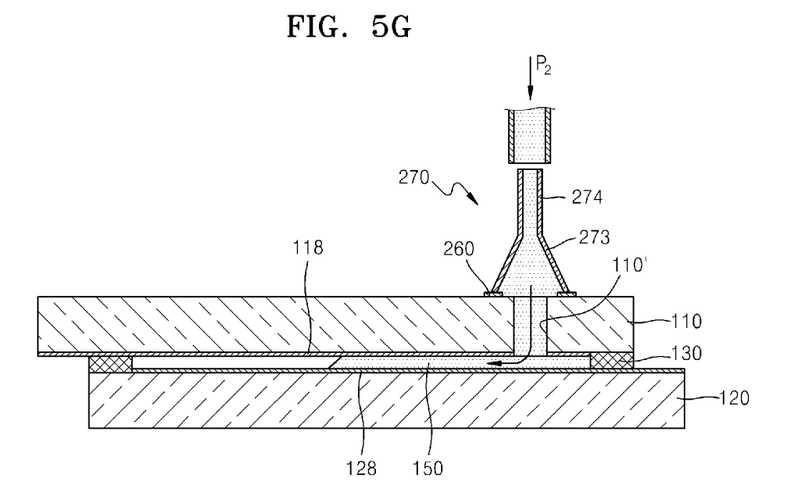

Next, the electrolyte 150 is injected through the inlet sealing member 270 fixed on the first substrate 110 (refer to FIG. 5G). For example, the electrolyte 150 may be injected into the substrate gap G by connecting a fluid pump (not shown) to the end of the inlet sealing member 270 and applying an appropriate pressure P2 thereto by the fluid pump. The injection of the electrolyte 150 may be performed until the substrate gap G is filled with a sufficient amount of the electrolyte 150. The inlet sealing member 270 accommodates a flow of the electrolyte 150, and thus the injection of the electrolyte 150 may be easily performed.

Figure 5H:
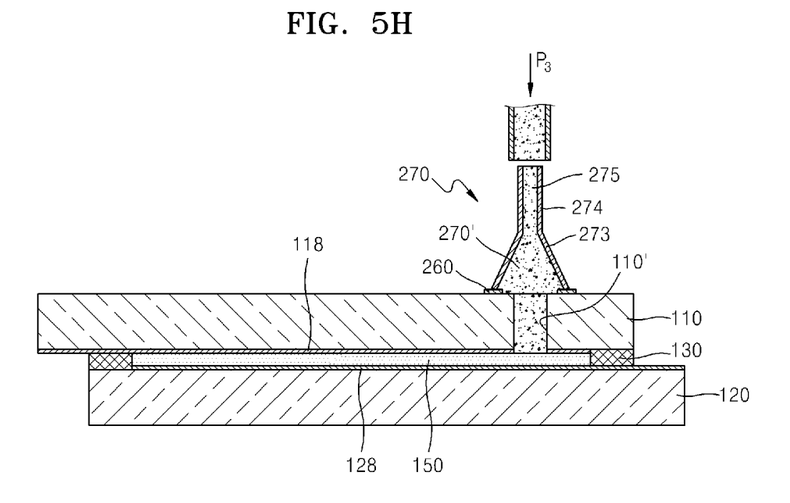
Figure 5I:
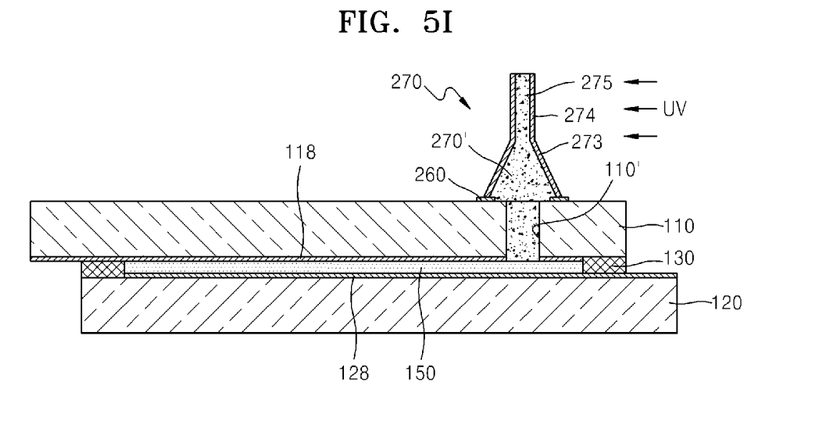

Next, a filling material 275 is injected into the internal space 270' of the inlet sealing member 270 through the inlet sealing member 270 fixed on the first substrate 110 (refer to FIG. 5H). For example, an inert gas, air, or a curable material is used as the filling material 275, but it is not limited thereto. For example, a UV curable material may be used as the filling material 275 and injected into the internal space 270' through the inlet sealing member 270 by connecting an appropriate pressurizing means (not shown) such as a fluid pump to the inlet sealing member 270 and applying an appropriate pressure P3 thereto by the pressurizing means.

Since the filling material 275 is injected into the internal space 270' of the inlet sealing member 270 to fill the internal space 270', leak of the electrolyte 150 may be prevented. In addition, when a closed end operation of the inlet sealing member 270, which will be described below, is performed by hot pressing, contamination of the closed end due to leaking of the electrolyte 150 out of a closed end may not occur and difficulties of the hot pressing process may be addressed. Moreover, problems of degeneration of the electrolyte 150 due to the hot pressing process may be solved.

For example, the internal space 270' is filled with the filling material 275 and thus an appropriate pressure is formed in the internal space 270' and the electrolyte 150 is pressed by the pressure. As a result, the leaking of the electrolyte 150 into the internal space 270' may be prevented.

The filling material 275 may be any material capable of filling the internal space 270' of the inlet sealing member 270 to form an appropriate internal pressure. For example, air may be used as the filling material 275.

The filling material 275 may prevent the degradation of the electrolyte 150, which is caused by external impurity materials permeating through the inlet sealing member 270 when an end of the inlet sealing member 270 is opened before the closed end operation of the inlet sealing member 270 and reacting with the electrolyte 150. For example, the filling material 275 may prevent the permeation of external impurity materials such as humidity or moisture.

Subsequent processes performed after the filling process may vary according to the properties of the filling material 275. For example, when a curable material is used as the filling material 275, a curing process may be appropriately performed after the injection of the filling material 275 into the internal space 270' (refer to FIG. 5I). For example, when a UV curable material is used as the filling material 275, the UV curable material may be cured to be gelated or solidified by irradiating UV radiation thereon. When a photo-curable material that exhibits differential flexibility according to the irradiation of light is used as the filling material 275, a light curing process may be performed. When a thermosetting material that exhibits differential flexibility according to temperature is used as the filling material 275, a heating or cooling process may be performed. Alternatively, when an inert gas is used as the filling material 275, a hot pressing process of the inlet sealing member 270 may be performed without separate subsequent processes.

Figure 5J:
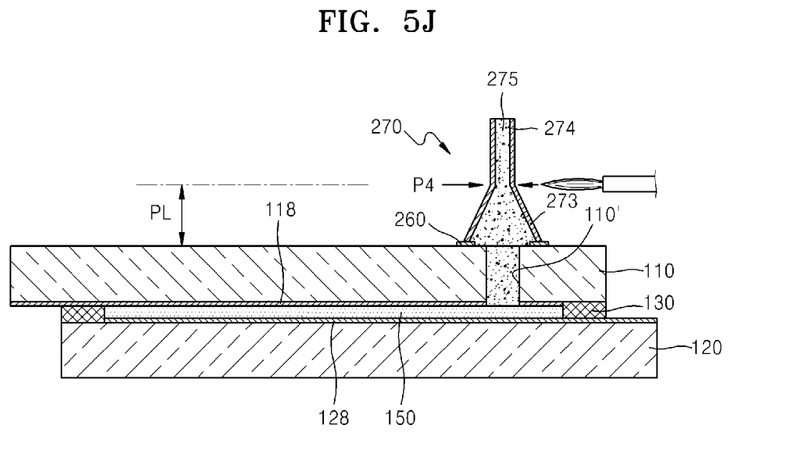
Figure 5K:
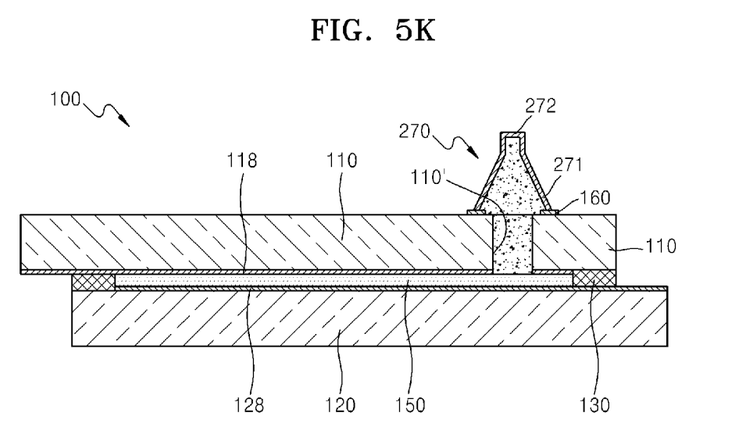

Next, a closed end process is performed on the inlet sealing member 270 (refer to FIGS. 5J and 5K). The inlet sealing member 270 is heated at an appropriately high temperature to soften, and a pressure P4 is appropriately applied to a desired portion of the inlet sealing member 270 to close the end of the inlet sealing member 270, thereby forming a closed end 272. For example, the inlet sealing member 270 may include a base part 273 that is fixed on the first substrate 110 to surround the electrolyte inlet 110' and an extension part 274 that is extended from the base part 273 in a small width. Heat and pressure are intensively applied to a desired portion of the extension part 274 having a small width to cut the remaining portion of the extension part 274, thereby forming the closed end 272. In this regard, a closed end may be appropriately formed according to the protrusion length PL of the inlet sealing member 270, and a final shape of the inlet sealing member 270 may vary according to the closed end. In FIG. 5K, an opened end of the inlet sealing member 270 is represented by reference numeral 271.

In the fabrication of the photoelectric conversion device 100, the sealing process of the electrolyte inlet 110' and the injecting process of the electrolyte 150 may be performed together. For example, in this embodiment, the inlet sealing member 270 for sealing the electrolyte inlet 110' is formed, and the electrolyte 150 is then injected through the inlet sealing member 270, and thus the injection of the electrolyte 150 may be easily performed. However, the fabrication of the photoelectric conversion device 100 is not limited to the above example. For example, the sealing process of the electrolyte inlet 110' and the injecting process of the electrolyte 150 may be separately performed.

As described above, at least one of the disclosed embodiments provides a photoelectric conversion device with an electrolyte inlet having a high sealing performance. The photoelectric conversion device includes a glass tube-shaped inlet sealing member that covers the electrolyte inlet, the inlet sealing member having an end that is closed by hot pressing. Therefore, the sealing characteristics of the electrolyte inlet may be enhanced. It should be understood that the disclosed embodiments should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from the spirit and scope of the following claims.

What is claimed is:

1. A photoelectric conversion device comprising:
   first and second substrates facing each other, wherein first and second electrodes are formed on the first and second substrates, respectively;
   an electrolyte inlet formed to pass through the first substrate and configured to receive an electrolyte; and
   an inlet sealing member connected to an external surface of the first substrate and outwardly extending from a top portion of the electrolyte inlet, wherein the top portion is formed in the external surface of the first substrate, and wherein the inlet sealing member comprises an encapsulation space being in fluid communication with the electrolyte inlet; and wherein the inlet sealing member comprises: a first end that is formed closest to the electrolyte inlet and open towards the electrolyte inlet; and a second end that is formed farthest from the electrolyte inlet and closed when viewed externally from the photoelectric conversion device; wherein the width of the first end is greater than the width of the second end.

2. The photoelectric conversion device of claim 1, wherein the inlet sealing member is connected to the first substrate via a glass frit.

3. The photoelectric conversion device of claim 1, wherein the inlet sealing member has a substantially conical shape.

4. The photoelectric conversion device of claim 1, wherein the first end contacts the first substrate and covers the top portion of the electrolyte inlet.

5. The photoelectric conversion device of claim 1, wherein the width of the first end is greater than the width of the top portion of the electrolyte inlet.

6. The photoelectric conversion device of claim 1, wherein the encapsulation space is filled with a filling material.

7. The photoelectric conversion device of claim 6, wherein the filling material comprises an inert gas or a curable material.

8. The photoelectric conversion device of claim 7, wherein the filling material comprises an ultraviolet (UV) curable material.

9. The photoelectric conversion device of claim 1, wherein the inlet sealing member is formed of a glass material.

10. A photoelectric conversion device comprising: first and second substrates facing each other;
- an electrolyte inlet formed to pass through at least one of the first and second substrates and configured to receive an electrolyte; and
- an inlet sealing member connected to the at least one substrate and extending from a top portion of the electrolyte inlet, wherein the top portion is formed in the external surface of the at least one substrate, and wherein the inlet sealing member is in fluid communication with the electrolyte inlet; and wherein the inlet sealing member comprises: a first end that is formed closest to the electrolyte inlet and open towards the electrolyte inlet; and a second end that is formed farthest from the electrolyte inlet and closed when viewed externally from the photoelectric conversion device; wherein the width of the first end is greater than the width of the second end.

11. The photoelectric conversion device of claim 10, wherein the inlet sealing member comprises:
- a first end that is formed closest to the electrolyte inlet, open towards the electrolyte inlet and covers the top portion of the electrolyte inlet; and
- a second end that is formed farthest from the electrolyte inlet and closed when viewed externally from the photoelectric conversion device, wherein the inlet sealing member has a width that substantially gradually decreases from the first end to the second end.

12. The photoelectric conversion device of claim 10, wherein the width of the first end is greater than the width of the top portion of the electrolyte inlet.

* * * * *